United States Patent
Bradley

(10) Patent No.: US 6,360,259 B1
(45) Date of Patent: Mar. 19, 2002

(54) METHOD FOR OPTIMIZING COMMUNICATION SPEED BETWEEN PROCESSORS

(75) Inventor: Peter C. Bradley, Rocky Hill, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 09/169,038

(22) Filed: Oct. 9, 1998

(51) Int. Cl.[7] .............................................. G06F 13/00
(52) U.S. Cl. ......................... 709/223; 709/221; 370/216
(58) Field of Search ................................ 709/223, 221, 709/234, 249; 370/216, 254, 434, 255

(56) References Cited

U.S. PATENT DOCUMENTS

| | | | |
|---|---|---|---|
| 5,434,976 A | * 7/1995 | Tan et al. ..................... | 709/234 |
| 5,513,171 A | 4/1996 | Ludwiczak et al. ......... | 370/254 |
| 5,689,661 A | 11/1997 | Hayashi et al. ............. | 710/131 |
| 5,729,546 A | 3/1998 | Gupta et al. ................. | 714/2 |
| 5,737,319 A | 4/1998 | Croslin et al. .............. | 370/255 |
| 5,745,735 A | 4/1998 | Cohn et al. .................. | 703/6 |
| 5,761,381 A | 6/1998 | Arci et al. .................... | 706/13 |
| 5,768,493 A | 6/1998 | Kumar ......................... | 370/434 |
| 5,805,816 A | * 9/1998 | Picazo et al. ................ | 709/223 |
| 6,006,275 A | * 12/1999 | Picazo et al. ................ | 709/249 |
| 6,038,212 A | * 3/2000 | Galand et al. ............... | 370/216 |

* cited by examiner

Primary Examiner—Ayaz Sheikh
Assistant Examiner—Khanh Quang Dinh

(57) ABSTRACT

A method is disclosed for selecting from among a plurality of computer processors connected together to distribute portions of an overall numerical problem to be solved among the processors to optimize the speed of communication between the processors in solving the overall problem. The method utilizes various factors in determining the selection, including whether any of the processors are located within the same computer or workstation, whether any of the processors share a network switch, whether any of the processors are located on the same sub-network, the speed of the individual network connections, and any user-configurable groupings of the processors. Also considered are the known communication requirements of the problem to be solved. A simulated annealing algorithm is then used to determine the optimal arrangement of the processors in solving the problem.

12 Claims, 2 Drawing Sheets

METHOD FOR OPTIMIZING COMMUNICATION SPEED BETWEEN PROCESSORS

TECHNICAL FIELD

This invention generally relates to a method of selecting from among a plurality of computer processors connected together, and more particularly to a method of distributing portions of an overall numerical problem to be solved among a plurality of interconnected processors for optimizing the speed of communication between the processors when solving the overall problem.

BACKGROUND ART

Parallel processing utilizes the combined power of a plurality of computer processors that are connected together and communicating with each other via physical network connections. The processors operate simultaneously in parallel to solve a numerical problem that is generally too large and complex for a single computer to handle in a timely manner. A further advantage of parallel processing is that the numerical problem solution capability afforded by a large number of networked processors can be much less expensive than that offered by a supercomputer. This is due primarily to rapid advances and decreasing costs in the design and manufacture of semiconductor computer processors and associated devices, which have allowed greater computational power and memory storage capacity to be integrated into a desktop machine such as a personal computer or workstation.

The overall numerical problem or domain to be solved is divided up into a number of smaller problems or "sub-domains", which are then each assigned to an associated processor. Each processor solves its associated sub-domain by means of local calculation and communication of intermediate results to other processors in order to achieve a complete solution for the domain. Due to the nature of the overall numerical problem to be solved, certain processors often communicate more frequently than other processors.

Rapid communication between the interconnected processors is essential for acceptable parallel processing performance. The time required to communicate a data message between processors is relatively longer and, thus, more expensive than the time spent by each processor in computing the data. For example, communication time may be measured in hundredths of a second, whereas computational time may be measured in millionths of a second. Thus, it is important to reduce, as best as possible, the communication time between processors when solving the overall problem.

One approach to the parallel solution of many large and complex problems is to utilize tens or hundreds of distributed processors. This approach is often known as "distributed", "cluster", or "network of workstations" parallel computing. The processors may typically be utilized to perform dedicated tasks, such as CAD drafting, during normal working hours. When used as such, the processors are unavailable for parallel processing in solving computational problems. However, a major advantage of distributed parallel processing is in its use of the processors during other than normal working hours to solve the computational problem. In this way, the processors may be utilized virtually continuously, 24 hours a day.

Typically, one or more processors may be located within a single workstation or personal computer. The workstations and computers may be located physically close to each other, or they may be remotely located apart from one another; for example, in different buildings or facilities, or in different cities, states or countries. The workstations and computers are linked together by a computer network connection, such as the popular Ethernet connection. Such a network connection typically contains a backbone, or main data communication routing path (such as wire connections within a building), together with numerous communication branches or paths connected to the backbone. A branch path may have one or more workstations or personal computers connected to the backbone via switches, which serve to connect multiple workstations and to pass communications as necessary from the workstations to the backbone.

Given this common type of multiple processor network connection, the resulting speed of communication between any two processors within the network is dependent upon the location of the each processor within the network. Generally, the fastest inter-processor communication is between two processors located within the same workstation or personal computer. In contrast, communication is somewhat slower between two processors located in different workstations but connected by a single network switch. Further, communication is even slower between processors connected to different network switches. This is because communication from a processor on one switch must be routed out through its switch and over the backbone connection and back through a second switch to reach the second processor. Generally, communication between processors becomes relatively slower with an increasing number of devices physically interposed between the processors.

Regardless of the type and number of physical connections employed, the number of communications between processors that are required during the computational solution of a problem generally depends upon both the type and size of the overall problem. Also, when solving a large computational problem using parallel processing, it is often the case that a processor must communicate with some processors more so than with others.

In the prior art of distributed parallel processing, it is known to utilize a plurality of computer processors to solve a computational problem as the processors are physically connected together. That is, the individual problem segments or sub-domains are not logically distributed across the network of processors for solution. Instead, the individual problem segments are randomly distributed across the processors for solution. As a result, there is no selection made from among the fixed connections between the plurality of processors to optimize the speed of communication between the processors. Rarely does this type of random connection result in an optimal connection in terms of speed of processor communication. Basically, this type of connection scheme does not take into account the various factors that inherently reside in a physical network connection of processors. These factors could potentially optimize or provide for much faster communication between the processors as they are simultaneously solving the computational problem.

DISCLOSURE OF INVENTION

An object of the present invention is to optimize the speed of communication between a plurality of distributed computer processors connected together and operating in parallel to solve a complex numerical problem.

Another object of the present invention is to increase the overall problem solving speed of a plurality of interconnected, distributed computer processors each operating to solve a sub-domain of the overall problem.

According to the present invention, a method of selecting from among a plurality of distributed computer processors connected together in a network utilizes various groups of factors to determine how individual segments of an overall problem are distributed among the processors for solution. In a preferred embodiment, three groups of factors are used. The factors generally relate to the known, existing physical connections among the processors in the network. Several factors within one group specifically relate to the topology of the network. The method makes no attempt to change these physical connections. Instead, the method takes the physical connections (and, thus, the associated communication times) between processors as being fixed. All of the factors influence the resulting speed of communication between the processors when solving the overall problem. Also, the method does not affect how the overall problem is broken up into individual sub-domains, nor does it influence how the overall problem is ultimately solved by the individual processors. Instead, after the problem is segmented, the method distributes the sub-domains for solution by the individual processors to optimize the speed of communication between processors thereby reducing the total time required to solve the overall problem.

The three groups of factors include: (1) a listing of the distributed computer processors available to solve the overall problem; (2) the known communication requirements of the problem to be solved; and (3) a number of specific topology factors. The topology factors include: (a) whether any of the processors are located within the same computer or workstation; (b) whether any of the processors share a network switch; (c) whether any of the processors are located on the same sub-network within a larger network; (d) the speed of the individual network connections; and (e) any user-configurable groupings of the processors.

A combinatorial optimization technique, such as the well-known simulated annealing algorithm, then uses these groups of factors to determine the optimal arrangement of processors for an overall problem. In arriving at the optimal arrangement, the simulated annealing algorithm uses the topology factors directly in an equation, while it uses the other groups of factors indirectly. Simulated annealing is an iterative process that proposes different distributions of the sub-domains among the available processors until an arrangement is reached whereby optimal communication speed among processors is achieved. The overall method of the present invention is preferably implemented in software that is executed by a computer processor within one or more of the workstations or personal computers within the network.

The above and other objects and advantages of the present invention will become more readily apparent when the following description of a best mode embodiment of the present invention is read in conjunction with the accompanying drawings.

BEST MODE FOR CARRYING OUT THE INVENTION

Figure 1:
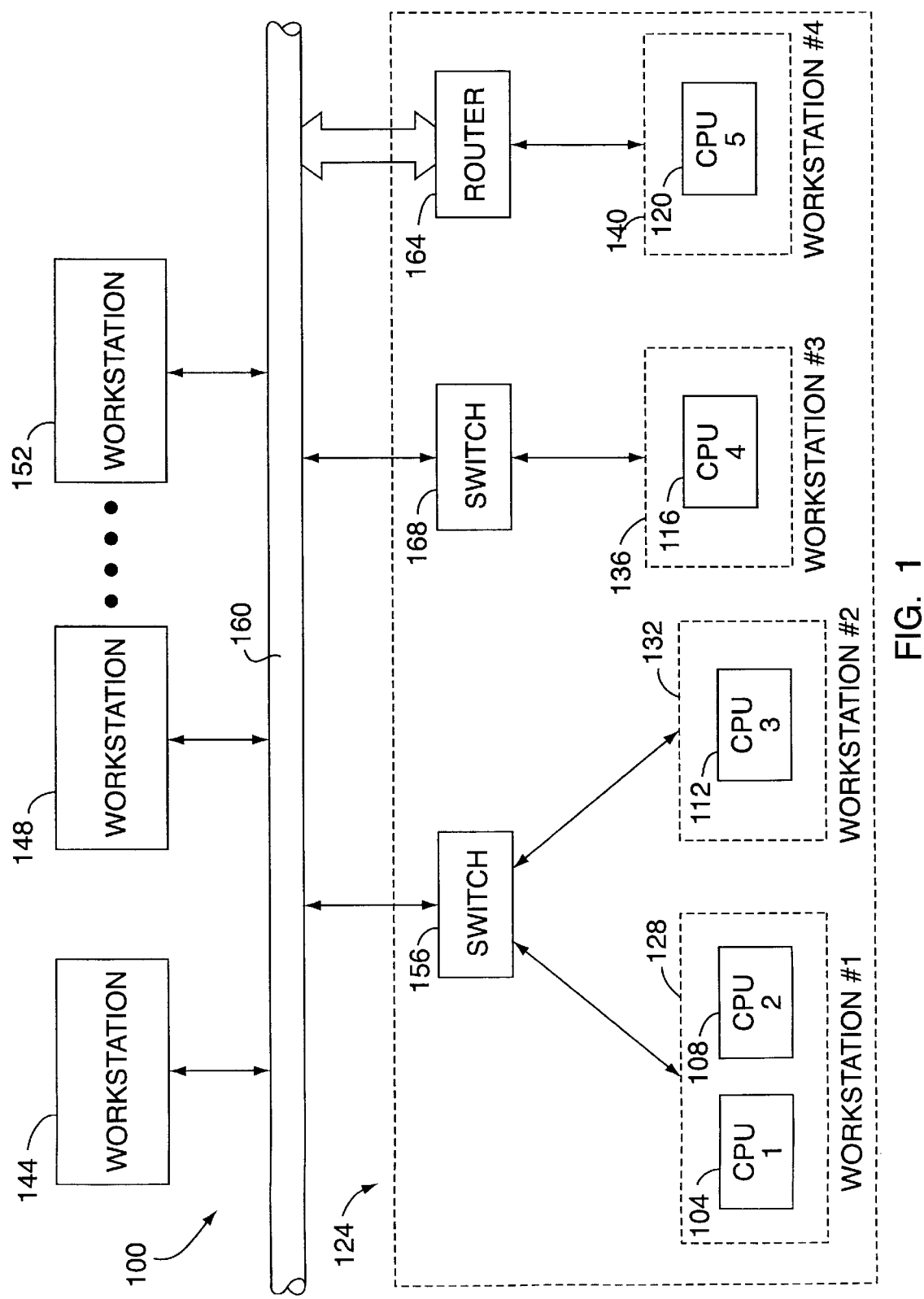
FIG. 1 is a block diagram of a plurality of computer processors connected together in an exemplary physical network connection.

Referring to FIG. 1, there illustrated is a typical, exemplary network connection 100 of a plurality of computer processors 104–120, with a portion 124 of the network connection shown in detail. In a preferred embodiment, each processor ("CPU") 104–120 is contained within a workstation or personal computer 128–152, such as those commercially available from Sun Microsystems, Silicon Graphics, Dell or Compaq. A single workstation or computer 128–152 may contain one or more computer processors 104–120 for executing a software computer program that manipulates data in a desired manner. As described in detail herein after, the method of the present invention is preferably implemented in software that is executed by one or more of the computer processors 104–120. The processors 104–120 may comprise, for example, known microprocessor devices commercially available from Intel, such as the Pentium processor. As is well known, the workstations 128–152 also include memory storage devices for storing software and data, often as part of the processor itself.

The workstations and computers 128–152 are interconnected into the overall physical network connection 100 comprising, for example, the popular Ethernet connection. The network connection between any two workstations 128–152 may be comprised of several network links in a variety of arrangements. A common network arrangement includes two or more workstations 128, 132 connected to a single network switch 156. This switch 156 may in turn be connected to a main routing path or backbone 160 over which data messages are communicated between the processors 104–120. The backbone 160 may be comprised of any type of physical communication connection such as, for example, a plurality of physical wire connections within a building. The backbone 160 may also include one or more routing devices 164 for handling data traveling along the backbone. The network connection 100 also includes a number of individual communication paths or branches connected to the backbone 160. Each path includes one or more workstations and computers 128–152 connected to the backbone through a switch 168.

It is to be understood that the arrangement of workstations and computers 128–152 of FIG. 1 is merely representative of a small portion of an overall exemplary connection of a large number of such workstations and personal computers 128–152. For example, it is not uncommon to utilize tens or hundreds of interconnected computer processors 104–120 embodied within corresponding workstations or computers 128–152. These networked workstations and computers may be distributed over a number of different buildings or facilities, or they may all reside within a single location. Whatever manner the processors 104–120 are distributed, the network connection 100 of FIG. 1 should be understood as being merely exemplary of one of many possible embodiments of networked processors, and it forms no part of the present invention.

Generally speaking, distributed parallel processing over a network of workstations involves a plurality of computer processors (such as those processors 104–120 and workstations 128–152 illustrated in FIG. 1) simultaneously executing software that efficiently solves a relatively large and complex numerical computational problem. For example, the flow of air in the vicinity of an airfoil may be solved by distributed processors executing software that implements the well-known Navier-Stokes mathematical equations of computational fluid dynamics. Typically, the entire problem is broken up into individual segments or sub-domains to make most efficient use of the networked processors. Each sub-domain is then solved by one of the processors. As each processor is solving its respective sub-domain, there is typically a need to communicate data ( e.g., local computational results) with one or more other processors in order to arrive at the overall solution for the entire problem or domain.

The method of the present invention does not influence the manner in which the overall numerical computational problem is broken up into sub-domains. Instead, the method utilizes the sub-domains as they exist after they are created. Thus, the manner of dividing up an overall problem into sub-domains forms no part of the method of the present invention. Also, the method of the present invention does not take into consideration how the overall problem is to be solved by the individual processors. It merely distributes the individual sub-domains among the individual processors for solution thereby. As such, the method only affects the speed of solution of the overall problem.

However, the method of the present invention takes into account the various physical network connections of the processors 104–120. The method treats these connections as fixed and having various known, inherent characteristics. All of these characteristics ultimately affect the speed of the processors 104–120 in solving the overall problem. The present invention distributes the sub-domains among the processors 104–120 for solution by examining the connections between processors and selecting the most favorable distribution in terms of optimal communication speeds. While this method does not change any of the physical connections between processors 104–120, it does involve examining a number of specific factors related to the individual network connections. Based on these factors, the method distributes the sub-domains among the processors utilizing an optimization technique, such as a simulated annealing algorithm.

Figure 2:
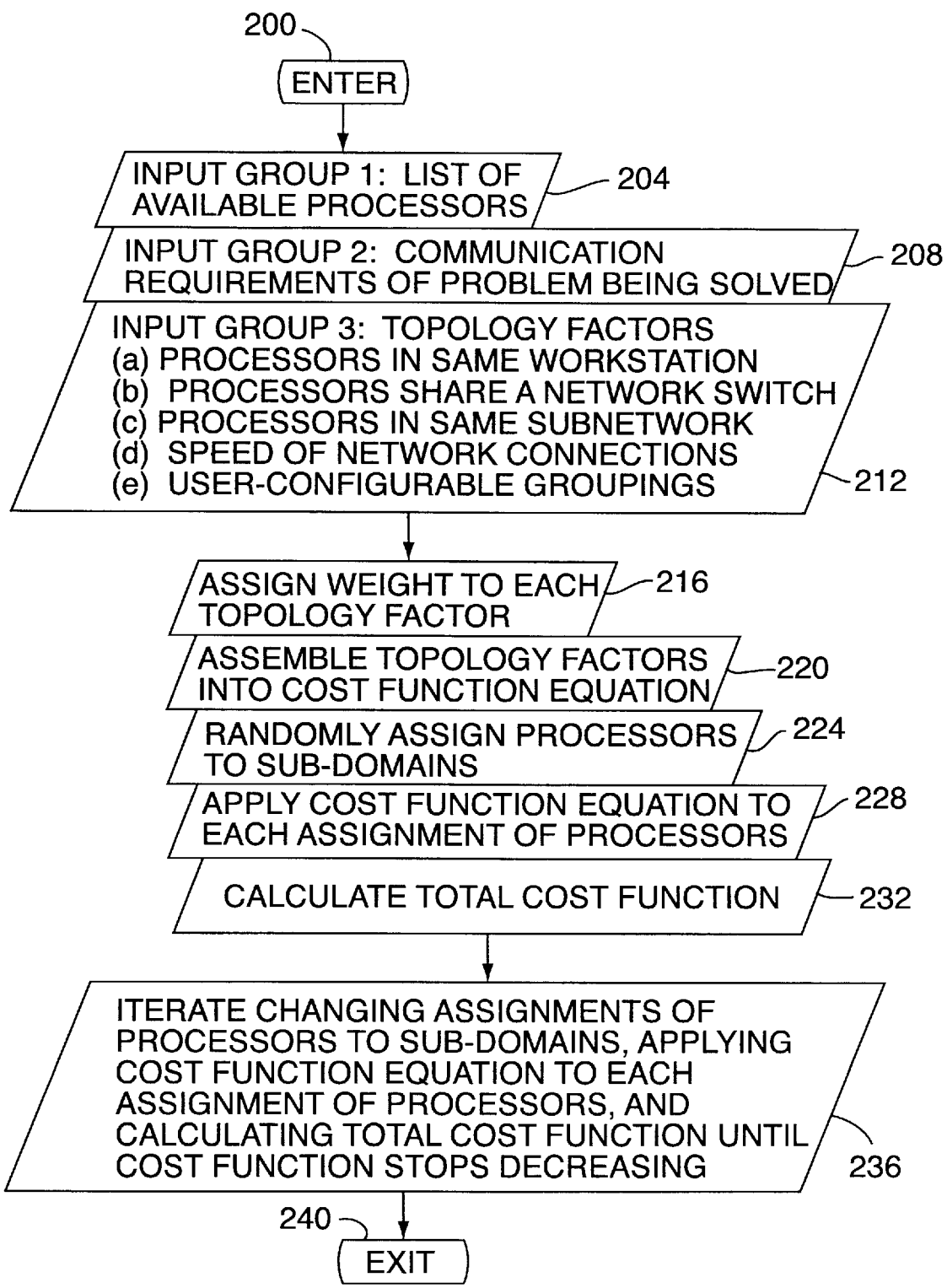
FIG. 2 is a flow diagram of the method of the present invention as implemented in software executed by one or more of the computer processors of FIG. 1, wherein the flow diagram includes a listing of the various groups of factors considered by the invention in optimizing the speed of communication between the computer processors solving an overall numerical problem.

Referring to FIG. 2, there illustrated is a flow diagram of software executed by one or more of the computer processors 104–120 of FIG. 1 (or one or more other processors that are part of the network connection 100 of FIG. 1) in carrying out the method of the present invention. The processor chosen to execute the flow diagram of FIG. 2 may comprise a processor that is utilized in the parallel processing involved in solving the overall numerical problem. It is to be understood that the processor(s) chosen to execute the software of the preferred embodiment of the present invention has no influence on the method of solving the overall numerical problem.

After an enter step 200, the processor 104–120 then assembles, coordinates or makes available data regarding the various groups of factors related to the physical connections between processors 104–120. These data, which represents known characteristics of the physical network connection 100, may be stored within the processor 104–120 or workstation 128–152. In an exemplary, preferred embodiment of the method of the present invention, the input factors are arranged in three different groups. The first input group comprises a list of available processors 104–120, as indicated in the step 204. This merely comprises an identification of all of the processors 104–120 that may be available at any time to participate in the parallel processing effort required to solve the overall numerical problem. Throughout the remainder of this discussion, the term "workstation" not only means a workstation is its traditional commercial sense, but also refers to various other types of devices each containing one or more computer processors; for example, personal computers (both desktops and laptops), mainframe computers, microprocessor-based equipment, and other types of computing devices. It suffices for the broadest scope of the present invention that the computer processor 104–120 utilized solves a portion of the overall numerical problem.

The second input group involves the communication requirements of the overall problem being solved, as indicated in the step 208. This factor is a direct result of the way in which the problem is divided into sub-domains. More specifically, as the overall domain is segmented, the nature of the solution of each sub-domain dictates that connections (i.e., communications) between any given pair of sub-domains may or may not be required. Further, some connections between sub-domains may require a larger amount of communication traffic than other connections.

The third input group comprises specific information about the topology of the physical network connection 100 regarding the distributed processors 104–120 available to participate in the parallel processing effort, as indicated in the step 212. The topology factors include: (a) whether any of the processors 104–120 are located within the same workstation 128–152; (b) whether any of the processors share a network switch; (c) whether any of the processors are located on the same sub-network within a larger network; (d) the speed of the individual network connections; and (e) any user-configurable groupings of the processors.

In view of the exemplary embodiment of FIG. 1, the first four topology factors should be readily apparent therefrom and involve known characteristics of the physical network 100. The fifth topology factor essentially involves a consideration of the unique physical characteristics of each processor 104–120, wherein these characteristics may affect the speed of communication between processors. For example, these characteristics may include the operational speed of the microprocessor that comprises the computer processor, together with the amount and access time of the various types of associated memory storage devices associated with the processor. Essentially, this fifth topology factor contains information about the speed of interprocessor communication that might not otherwise be readily apparent from a cursory view of the network connection 100.

Once the three groups of input factors are considered, the flow diagram of FIG. 2 then transitions into an optimization technique to determine the optimum distribution of the individual problem segments or sub-domains among the individual processors for solution thereby. In a preferred exemplary embodiment, the optimization technique comprises the well-known simulated annealing algorithm.

In a step 216, the topology factors are each assigned a weight or cost function based on the perceived relative importance of each factor to the overall problem solution capability afforded by the present invention. Generally, these weights may vary for each problem being solved. Also, this weighting may be used to make some of the factors able to override other factors. According to an exemplary embodiment, the hierarchy of weights for the five factors is taken to be as the factors are listed herein above.

Next, in a step 220, the topology factors are assembled into the following equation, which defines a "cost" function (where "cost" refers to speed of communication between processors 104–120) for each possible network connection of two different computer processors:

$$F_{conn} = A*f_1 + B*f_2 + C*f_3 + D*f_4 + E*f_5 \qquad \text{(Equation 1)}$$

where: "$F_{conn}$" is the total cost function or speed for each connection of two processors; where "A", "B", "C", "D" and "F" are the individual weights assigned to each factor on the perceived relative importance of each factor to the solution of the problem; and where "$f_1$" is a binary value indicating whether or not the two connected processors are located within the same workstation, "$f_2$" is a binary value indicating whether or not the two connected processors share a network switch; "$f_3$" is a binary value indicating whether or not the two connected processors are located on the same sub-network within a larger network; "$f_4$" is a quantity indicating the speed of the individual network connections; and "$f_5$" is a cost associated with any user-configurable groupings of the processors.

The cost function equation above, Equation 1, is applied as follows: initially, in a step 224, all of the available processors are randomly assigned to the individual problem sub-domains after the overall problem or domain is divided up into individual sub-domains. Since the connections between sub-domains are a known input group, and since each processor has been assigned to each sub-domain, it is then possible to determine which processors 104–120 will be connected for this initial assignment of processors to sub-domains. Next, applying Equation 1 to each of these connections in a step 228, the cost (i.e., communication speed) of all of the required connections between processors 104–120 for this initial assignment is determined. A total cost is then calculated, in a step 232, as the sum of the costs for all of the connections in this initial assignment of processors to sub-domains (i.e., summing all the resulting values of $F_{conn}$).

Next, in a step 236, the simulated annealing algorithm changes some of the assignments of processors 104–120 to sub-domains from the initial assignment described above. Generally, early on in the simulated annealing algorithm, the changes to the assignments are relatively greater in magnitude than changes made later on in the algorithm. Regardless, after each change the simulated annealing algorithm assesses the costs for the individual proposed assignment of processors to sub-domains, as well as the total cost. As is typical in a simulated annealing process, the previous changes to the assignment of processors to sub-domains will be retained or discarded based on whether the total cost has been reduced (i.e., improved) or has increased. Changes that improve the total cost will always be retained, while changes that increase the total cost may or may not be retained. This simulated annealing process essentially continues in an iterative manner while gradually increasing the probability that changes which do not improve the cost function will be discarded. The process continues until repeated re-assignments of processors to sub-domains no longer result in an improvement in the total cost function. The flow diagram then exits in a step 240.

In an exemplary embodiment, the simulated annealing algorithm utilized may be that described in Ross, William H. et al., "Numerical Recipes in Fortran: The Art of Scientific Computing", 2d ed., Chap. 10.9, which is hereby incorporated by reference.

In a preferred embodiment, the method of the present invention is readily implemented in software written in the popular C programming language. The software implements the flow diagram of FIG. 2 and is executed by one or more computer processors 104–120 embodied within a corresponding one or more workstations 128–152, such as those illustrated in FIG. 1. Generally, it is irrelevant which workstation in FIG. 1 the software embodying the method of the present invention resides on.

The method of the present invention has been described as using a simulated annealing algorithm to distribute the sub-domains among the available processors 104–120 for solution. This algorithm utilizes the various processor connection characteristics as inputs. However, it should be understood that optimization techniques other than simulated annealing may be utilized without departing from the broadest scope of the present invention. For example, the known, genetic optimization algorithm may be utilized. The genetic optimization algorithm may be similar to that described in U.S. Pat. No. 5,761,381, which is hereby incorporated by reference.

In the alternative, a "brute force" method of optimizing the network connection may be used. Such a method refers to the repeated, random use of different combinations of processor connections, and then examining the communication times that result, to see when minimum or optimal communication times have been achieved. Alternatively, all possible assignments of processors 104–120 to sub-domains could be tested and the assignment with the lowest cost (i.e., speed) could be selected. It is expected that such methods of optimization will take longer than the simulated annealing algorithm to locate the optimal connection of processors, and might in fact be so time-consuming as to be unusable.

Although the present invention has been shown and described with respect to the detailed embodiments thereof, it will be understood by those skilled in the art that various changes in the form and detail thereof may be made without departing from the broadest scope of the claimed invention.

Having thus described the invention, what is claimed is:

1. A method of distributing a plurality of portions of a numerical problem to be solved among a corresponding plurality of computer processors for optimizing the speed of communication of data between the computer processors when solving the numerical problem, the computer processors being connected together in a network connection, the method comprising the steps of:

identifying a plurality of characteristics of the network connection, each of the identified plurality of characteristics of the network connection being related to a speed of communication of data between any two of the plurality of computer processors connected together in the network connection; and assigning each one of the plurality of portions of the numerical problem to a corresponding at least one of the plurality of computer processors, wherein the step of assigning assigns each one of the plurality of portions of the numerical problem to a corresponding at least one of the plurality of computer processors based on the speed of communication of data between the plurality of computer processors connected together in the network connection;

wherein the step of assigning each one of the plurality of portions of the numerical problem to a corresponding at least one of the computer processors further comprises the steps of:

iteratively assigning each one of the plurality of portions of the numerical problem to a corresponding at least one of the computer processors; and determining an existence of an optimum condition regarding the speed of communication of data among the plurality of computer processors; and wherein the step of iteratively assigning each one of the plurality of portions of the numerical problem to a corresponding at least one of the computer processors until the optimum arrangement condition is determined to exist, further comprises the steps of:

randomly assigning each one of the plurality of portions of the numerical problem to a corresponding at least one of the computer processors;

determining whether the optimum speed exists; and if the optimum speed condition does not exist then iteratively assigning each one of the plurality of portions of the numerical problem to a corresponding at least one of the computer processors until the optimum speed condition is determined to exist.

2. The method of claim 1, wherein the step of identifying a plurality of characteristics of the network connection further comprises a step of identifying characteristics related to physical connections between the plurality of computer processors connected in the network connection.

3. The method of claim 2, wherein the characteristics related to the physical connections between the plurality of computer processors connected in the network connection include whether any of at least two of the plurality of computer processors are contained within a computing device.

4. The method of claim 2, wherein the characteristics related to the physical connections between the plurality of computer processors connected in the network connection include whether any of at least two of the plurality of computer processors are connected to the same network switching device.

5. The method of claim 2, wherein the characteristics related to the physical connections between the plurality of computer processors connected in the network connection include whether any of at least two of the plurality of computer processors are located on the same sub-network within the network connection.

6. The method of claim 2, wherein the characteristics related to the physical connections between the plurality of computer processors connected in the network connection include a speed of a physical connection to the computer node containing any of the plurality of computer processors.

7. The method of claim 2, wherein the characteristics related to the physical connections between the plurality of computer processors connected in the network connection include any characteristics of each one of the plurality of computer processors relating to a speed of each one of the plurality of computer processors.

8. The method of claim 1, wherein the step of determining whether the optimum speed condition exists further comprises the steps of:

calculating a value of a cost function that is a function of the plurality of characteristics of the network connection; and determining when the calculated value of the cost function has stopped decreasing so as to indicate a determination of the existence of the optimum speed condition.

9. The method of claim 1, wherein the step of assigning each one of the plurality of portions of the numerical problem to a corresponding at least one of the plurality of computer processors further comprises a simulated annealing process.

10. The method of claim 1, further comprising the step of identifying at least one communication requirement of at least one of the portions of the numerical problem to be solved.

11. The method of claim 10, wherein the step of identifying at least one communication requirement of at least one of the portions of the numerical problem to be solved further includes the step of determining an existence of any communication of data between any two of the plurality of computer processors connected in the network connection.

12. The method of claim 10, wherein the step of identifying at least one communication requirement of at least one of the portions of the numerical problem to be solved further includes the step of determining an amount of any communication of data between any two of the plurality of computer processors connected in the network connection.

* * * * *